US008774163B2

(12) United States Patent
Lin

(10) Patent No.: US 8,774,163 B2
(45) Date of Patent: Jul. 8, 2014

(54) COMMUNICATION SYSTEM AND METHOD FOR IMPLEMENTING IP CROSS-DOMAIN INTERCONNECTING VIA BORDER MEDIA GATEWAY

(75) Inventor: Yangbo Lin, Guangdong (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1792 days.

(21) Appl. No.: 11/688,577

(22) Filed: Mar. 20, 2007

(65) Prior Publication Data

US 2007/0217402 A1 Sep. 20, 2007

Related U.S. Application Data

(63) Continuation of application No. PCT/CN2006/000820, filed on Apr. 27, 2006.

(30) Foreign Application Priority Data

Apr. 30, 2005 (CN) .......................... 2005 1 0069842
Apr. 30, 2005 (CN) .......................... 2005 1 0070361

(51) Int. Cl.
H04L 12/66 (2006.01)
H04M 3/42 (2006.01)
H04M 1/56 (2006.01)
H04M 15/06 (2006.01)

(52) U.S. Cl.
USPC . 370/352; 370/356; 379/142.01; 379/201.01; 379/201.11; 379/210.02

(58) Field of Classification Search
USPC ............. 370/352, 401, 466, 356; 379/142.01, 379/201.11, 201.01, 210.02
See application file for complete search history.

(56) References Cited

U.S. PATENT DOCUMENTS 6,856,676 B1 * 2/2005 Pirot et al. ............... 379/201.01
7,002,973 B2 * 2/2006 MeLampy et al. ............ 370/401
(Continued)

FOREIGN PATENT DOCUMENTS

| CN | 1527550 | 9/2004 |
| CN | 1571440 | 1/2005 |
| CN | 1581872 | 2/2005 |
| CN | 1859339 A | 11/2006 |

(Continued)

OTHER PUBLICATIONS

Telecommunications and Internet converged Services and Protocols for Advanced Networking (TISPAN); Gate Control Protocol, Jul. 2004, ETSI TS 102 333, www.etsi.org/deliver/etsi_ts/102300_102399/102333/01.01.02_60/ts_102333v010102p.pdf.*

(Continued)

Primary Examiner — Nicholas Jensen
(74) Attorney, Agent, or Firm — Slater & Matsil, L.L.P.

(57) ABSTRACT

A communication system for implementing IP cross-domain interconnecting via Border media Gateway (BG) includes: different IP domains, each of which includes: a Media Gateway Controller (MGC) for call control and a Media Gateway (MG) for media bearing; the communication system includes a BG for implementing interconnecting of the IP domains as well. A communication method based on the communication system, includes: a calling MG and a called MG located in different IP domains implements call switching and media stream creating with a BG under the control of MGCs in the different IP domains; and the calling MG communicates with the called MG based on the media streams created. Thus the cross-domain interconnecting between different IP domains via BGs is realize.

6 Claims, 3 Drawing Sheets

(56) References Cited

U.S. PATENT DOCUMENTS

| | | | |
|---|---|---|---|
| 7,463,634 B1* | 12/2008 | Hansen | 370/395.2 |
| 2002/0112073 A1* | 8/2002 | MeLampy et al. | 709/240 |
| 2003/0046403 A1* | 3/2003 | Schmidt | 709/228 |
| 2004/0190498 A1 | 9/2004 | Kallio et al. | |
| 2005/0025189 A1 | 2/2005 | Smith | |
| 2005/0237997 A1* | 10/2005 | Hoffmann | 370/352 |
| 2006/0251052 A1* | 11/2006 | Croak et al. | 370/352 |

FOREIGN PATENT DOCUMENTS

| | | |
|---|---|---|
| EP | 1650916 A1 | 4/2006 |
| WO | 02/099567 A2 | 12/2002 |

OTHER PUBLICATIONS

"Series H: Audiovisual and Multimedia Systems Infrastructure of audiovisual services—Communication procedures"; ITU-T Telecommunication Standardization Sector of ITU; International Telecommunication Union; H.248.1 (Sep. 2005); Gateway control protocol: Version 3; 206 pages.

Andreasen, F., et al.; "Media Gateway Control Protocol (MGCP)" Version 1.0; Network Working Group Request for Comments 3435; Obsoletes: 2705; Cisco Systems; Jan. 2003; 187 pages.

English translation of the Written Opinion of the International Searching Authority for International Application No. PCT/CN2006/000820, dated Aug. 17, 2006.

Extended European Search Report for European Patent Application No. 06722411.3, dated Mar. 30, 2011.

Chinese Office Action for Chinese Patent Application No. 2005100703614, dated Mar. 28, 2008, and partial English translation thereof.

Chinese Office Action for Chinese Patent Application No. 200510069842.3, dated Mar. 1, 2008, and partial English translation thereof.

\* cited by examiner

COMMUNICATION SYSTEM AND METHOD FOR IMPLEMENTING IP CROSS-DOMAIN INTERCONNECTING VIA BORDER MEDIA GATEWAY

CROSS-REFERENCE TO RELATED APPLICATIONS

This application is a continuation of International Application No. PCT/CN2006/000820 filed Apr. 27, 2006. This application claims the benefit of Chinese Patent Application Nos. 200510070361.4 filed Apr. 30, 2005 and 200510069842.3 filed Apr. 30, 2005. The disclosures of the above applications are incorporated herein by reference.

FIELD

The present disclosure relates to the network communication technology, and more particularly, to a communication system and a communication method for implementing IP cross-domain interconnecting via Border media Gateway (BG).

BACKGROUND

The statements in this section merely provide background information related to the present disclosure and may not constitute prior art.

FIG. 1 is a schematic diagram illustrating the networking of a single network of Next Generation Network (NGN). As shown in FIG. 1, the Media Gateway Controller (MGC) and Media Gateway (MG) are two key components of NGN. The MGC is in charge of the call control function while the MG is in charge of the service bearer function, which separates the call control plane from the service bearer plane, so as to share network resources sufficiently and simplify the device upgrading and the service extension, thereby lower the development and maintenance cost greatly.

In order to make an MG cooperate with an MGC, a media gateway control protocol is needed between the MGC and the MG. The media gateway control protocol is a major protocol used in communication between an MG and an MGC, and two of such protocols widely used are H.248/MeGaCo and MGCP.

MGs usually establish a Real-time Transmission Protocol (RTP) media streams between each other to communicate under the control of an MGC.

According to different network positions where MGs are located, an MG may have two functions. The first function is to bear media streams in a single IP domain as User Network Interface (UNI), for example, the interconnecting in a same IP domain of a single operator, such an MG is also called a common MG; the second function is to bear cross-domain media streams in multiple IP domains as Network Node Interface (NNI), for example, the interconnecting among the IP domains of different operators or among the different IP domains of a same operator, typically, between an enterprise network and a core network, such an MG is also called a BG or an IP-IP MG. So far, a BG has been suggested to be needed in the implementation of interconnecting between different IP domains but no specific implementing method is given.

At present, there are various IP domains in which constitution mechanisms of the media streams may be different, such as different IP subnet addresses of an IP network, interconnecting IPv4 and IPv6 networks, and different media coding/decoding algorithms. Along with the development of services, it has become a pressing need to make these media streams of different IP networks interconnect.

SUMMARY

Embodiments of the present invention provide a communication system and a communication method for implementing IP cross-domain interconnecting via Border media Gateway (BG), so as to implement the interconnecting between different IP domains.

The specific solution in accordance with the present invention is as follows:

A communication system for implementing IP cross-domain interconnecting via Border media Gateway (BG) includes:

a Media Gateway Controller (MGC) of Internet Protocol (IP) domain for call control;

an MGC of a called IP domain for call control;

a calling Media Gateway (MG) in the calling IP domain, for bearing media, and creating media streams between a user side and a network side under the control of the MGC of the calling IP domain;

a called MG in the called IP domain, for bearing media, and creating media streams between the user side and the network side under the control of the MGC of the called IP domain;

a BG for processing and forwarding media streams between the calling MG and the called MG.

A communication method for implementing IP cross-domain interconnecting via Border media Gateway (BG) includes:

implementing call switching and media stream creating with a BG, by a calling Media Gateway (MG) in a calling Internet Protocol (IP) domain and a called MG in a called IP domain adjacent with the calling IP domain, under the control of a Media Gateway Controller (MGC) of the calling IP domain, an MGC of the called IP domain and an MGC responsible for the BG, respectively;

implementing, communication between the calling MG and the called MG based on the media streams created.

As may be seen from the above solution, in accordance with embodiment of the present invention, when a calling MG in a calling IP domain needs to communicate with a called MG in a called IP domain adjacent with the calling IP domain, the calling MG and the called MG implement call switching and media stream creating with a BG under the control of the MGC of the calling IP domain and the MGC of the called IP domain, respectively; the calling MG implements, via a BG, communications with the called MG based on the media streams created. In accordance with the embodiment of the present invention, the communication between two different IP domains may be implemented via one or multiple BGs.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
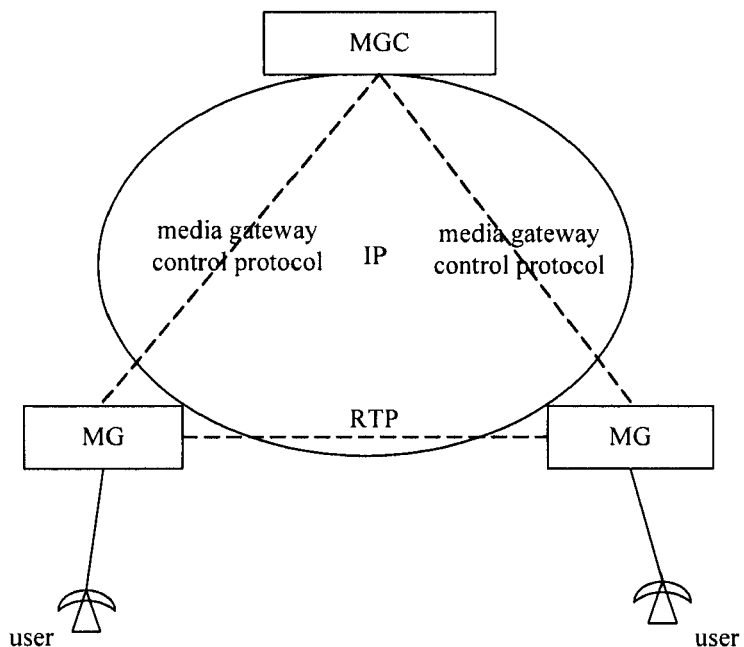
FIG. 1 is a schematic diagram illustrating the networking of a single network of Next Generation Network (NGN).

The following description is merely exemplary in nature and is not intended to limit the present disclosure, application, or uses. It should be understood that throughout the drawings, corresponding reference numerals indicate like or corresponding parts and features.

When a calling MG needs to communicate with a called MG located in another domain, the calling MG and the called MG implements call switching and media stream creating with a BG under the control of their own MGCs, respectively; the calling MG implements, via the BG, cross-domain communication with the called MG based on the media streams.

This invention is hereinafter further described in detail with reference to the accompanying drawings as well as embodiments so as to make the technical solution and merits thereof more apparent.

Figure 2:
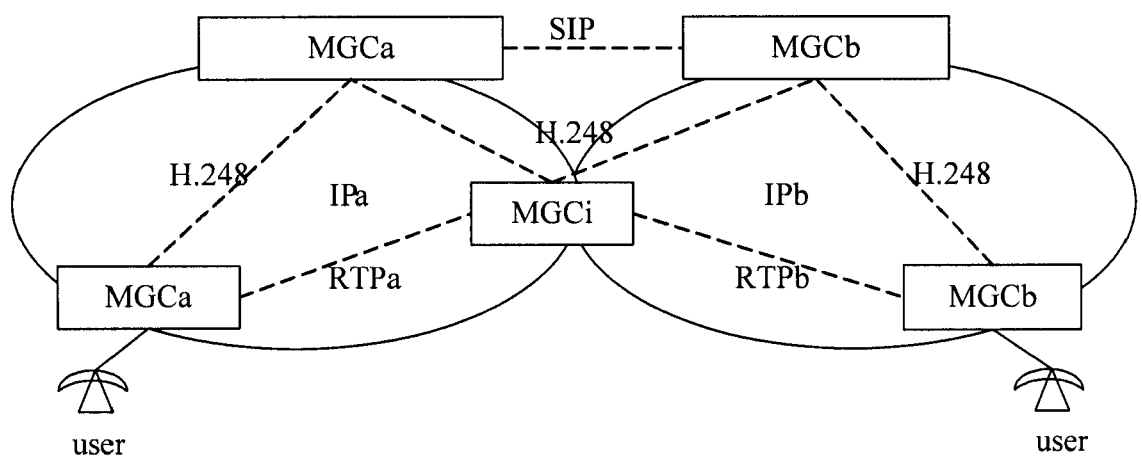
FIG. 2 is a schematic diagram illustrating the networking of communication system in accordance with Embodiment 1 of the present invention.

FIG. 2 is a schematic diagram illustrating the networking of communication system in accordance with Embodiment 1 of the present invention. As shown in FIG. 2, which is a schematic diagram of implementing, via a single BG, IP cross-domain interconnecting directly based on the MGC-MG control mode. The communication system adopts two IP domains, i.e., IPa domain and IPb domain which may be homogeneous or heterogeneous, and/or, the communication in each domain may adopt different protocols. Herein, the homogeneous or heterogeneous indicates whether the constitution mechanisms of two adjacent IP domains are the same, for example, whether or not the transmission protocols, the address formations, the coding/decoding types or the encryption/authentication algorithms adopted by the two IP domains are the same.

In FIG. 2, MGCa and MGCb are MGCs respectively belongs to IPa domain and IPb domain and are respectively used for controlling common MGs of IPa domain and IPb domain. MGi is a BG and is used for processing and forwarding media streams between the MGs of the adjacent IP domains to implement communication between MGs of the adjacent IP domains, and implementing protocol conversion between IPa and IPb domains. MGa and MGb are common MGs and are used for representing users to implement call switching and media stream creating between the user side and the network side under the control of MGC. In the aspect of resource, one physical gateway may be divided into multiple logical gateways or virtual gateways which are respectively controlled by multiple MGCs, therefore, MGi, MGa and MGb shown in FIG. 2 are all logical entities, i.e. virtual gateways.

With respect to a common MG as User Network Interface (UNI), when the common MG is instructed by an MGC to create Time Division Multiplex-Real-time Transmission Protocol (TDM-RTP) media streams, information of RTP media coding/decoding algorithm and packing period of time of the IP domain are usually needed to be given in the instruction sent to the common MG. Such information as RTP addresses and ports of the other end of media streams may also be given in the instruction sent to the common MG if possible; and then the information, such as appropriate RTP addresses and ports at the local end of the media stream may be selected by the common MG.

Figure 3:
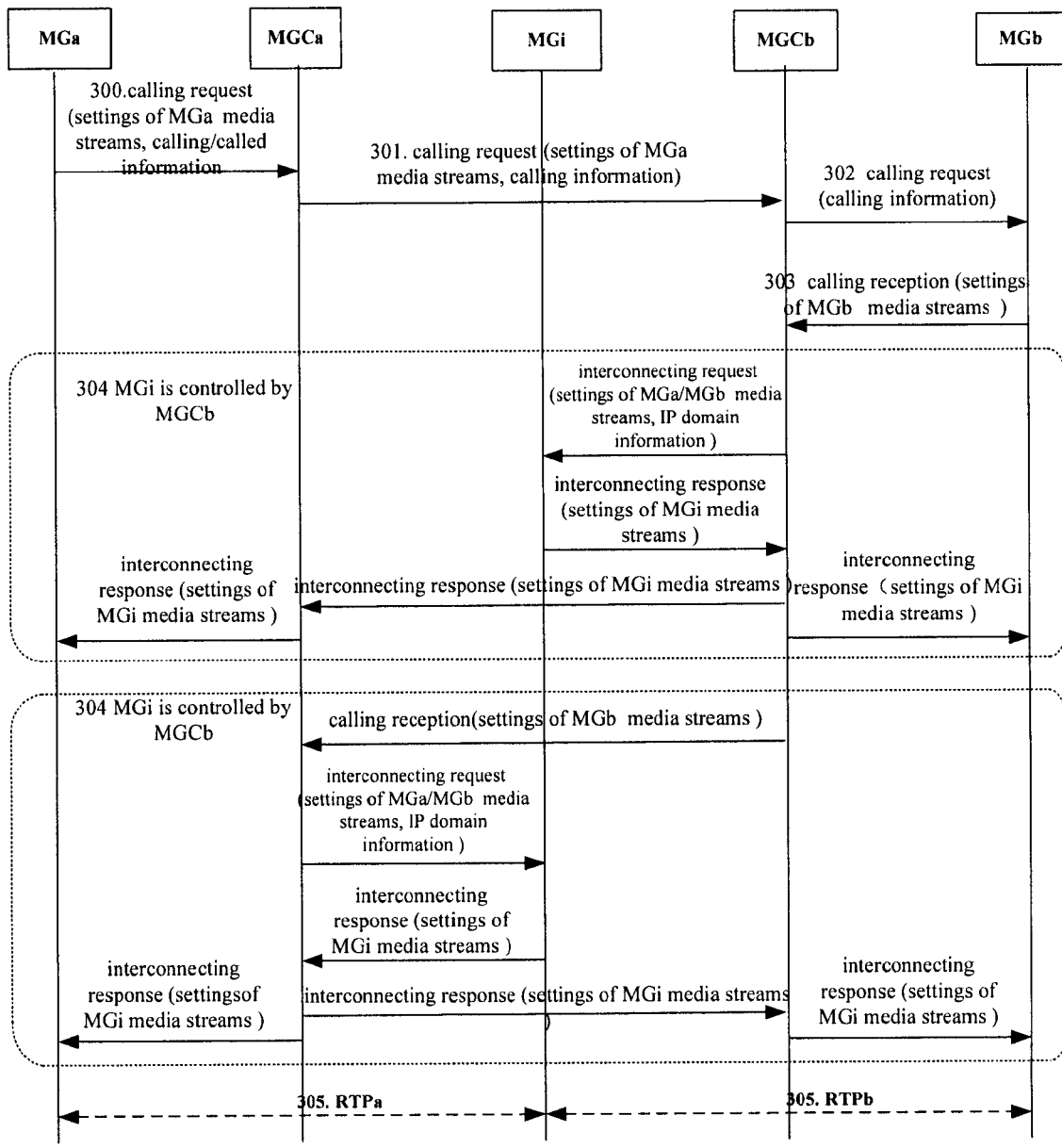
FIG. 3 is a stream chart of the communication method with the networking described by Embodiment 1 of the present invention.

With respect to a BG as Network Node Interface (NNI), when the BG is instructed by an MGC to create RTP-RTP media streams, information of the corresponding IP domain besides the aforesaid information needing to be sent to the common MG needs to be indicated in the instruction sent to the BG. All the information is carried via a media gateway control protocol. FIG. 3 is a stream chart of communication method of the networking described in Embodiment 1 of the present invention. The communication method for implementing IP cross-domain interconnecting via a single BG is hereinafter described in detail with reference to FIG. 2. In this embodiment, suppose that a calling user of MGa in IPa domain initiates a call request to a called user of MGb in IPb domain, and the method includes the following steps:

Step 300: MGa reports the call request initiated by the calling user of MGa to MGCa in charge of MGs in IPa domain via a media gateway control protocol, such as H.248.

Settings of calling media streams, i.e. settings of MGa media streams, called information, such as called number or called name and calling information, such as calling number or calling name, are included in the call request.

Step 301: MGCa finds that the called user is located in IPb domain by analyzing the called information in the call request, and forwards the call request to MGCb in charge of MGs of IPb domain via a call control protocol, such as Session Initiation Protocol (SIP).

Step 302: MGCb issues the calling information in the call request to MGb via a media gateway control protocol, such as H.248.

Step 303: if the called user of MGb accepts the call request of the calling user according to the calling information acquired from the MGCb, MGb configures settings of called media streams, i.e. settings of MGb media streams, and reports to MGCb a call acceptance including the settings of the called media streams.

In this step, whether to accept the call request of the calling user may be determined by the called user, according to the calling information such as the calling number or the calling name, in a manual or preset manner. For example, in the manual manner, whether to accept the call request is determined by the called user after the called user terminal displays or plays the calling information; in the preset manner, call requests of some special calling users may be directly accepted or rejected according to a preset white list or black list.

If the call request is not accepted by the called user of MGb, this calling procedure terminates.

Step 304: if MGi implementing IP interconnecting is controlled by MGCb, MGCb may send to MGi, via a media gateway control protocol such as H.248, an interconnecting request including IP domain information of the calling MG, the settings of the calling media streams, IP domain information of the called MG and the settings of the called media streams, to instruct the BG to create media streams to the calling MG and to the called MG respectively; MGi respectively creates media streams RTPa from MGi to MGa and media streams RTPb from MGi to MGb according to the IP domain information of calling MG, IP domain information of called MG, the settings of the calling media streams and the settings of the called media streams. MGi returns to MGCb an interconnecting response including the settings of media streams RTPa and RTPb that are configured by MGi and the settings of the called MGi media streams; MGCb sends the interconnecting response received from the MGi to MGa (forwarded via MGCa) and MGb, respectively.

If MGi implementing IP interconnecting is controlled by MGCa, MGCb forwards to MGCa the call acceptance received from the MGi; after acquiring the settings of the called media streams from the call acceptance, MGCa sends to MGi an interconnecting request including IP domain information of calling MG, the settings of the calling media streams, IP domain information of called MG and the settings of the called media streams; MGi respectively creates media streams RTPa from MGi to MGa and media streams RTPb from MGi to MGb according to the IP domain information of calling user, IP domain information of called user, the settings of the calling media streams and the settings of the called media streams. MGi returns to MGCa an interconnecting response including the settings of media streams RTPa and RTPb configured by MGi; MGCa sends the interconnecting response received from MGi to MGb (forwarded via MGCb) and MGa, respectively.

Whether MGi is controlled by MGCa or MGCb is implemented by configuring, which in fact determines the IP domain where MGi is operated, and the interconnecting of the other IP domain is implemented with the help of MGi of the IP domain where MGi is operated.

Step 305: after receiving the settings of media streams RTPa and RTPb from MGi, MGa and MGb communicate with MGi via media streams RTPa and RTPb respectively.

Thus, interconnecting of media streams RTPa of IPa and media streams RTPb of IPb is realized via MGi, and communication between the calling user of MGa and the called user of MGb is realized via MGi.

In accordance with Embodiment 1 of the present invention, the communication between two different IP domains may be implemented via a single BG. Alternatively, IP cross-domain interconnecting may be implemented via multiple BGs in accordance with another embodiment of the present invention. The description is hereinafter given by taking two BGs as an example.

Figure 4:
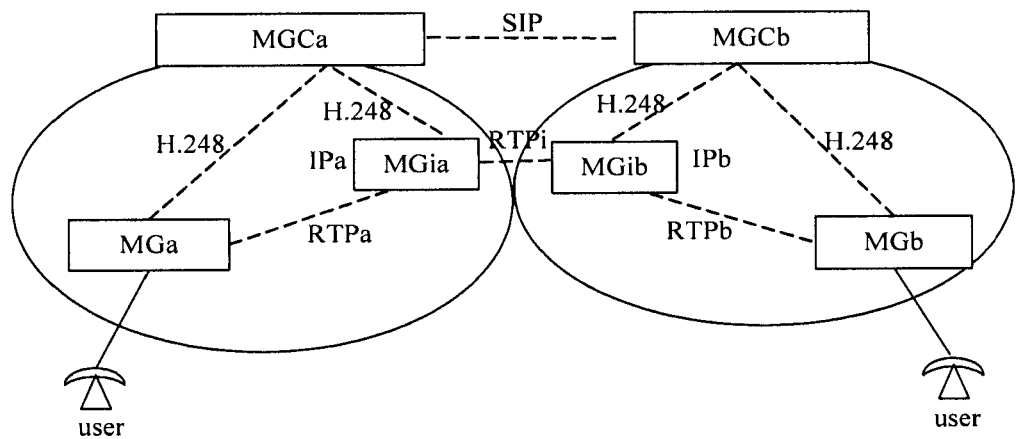
FIG. 4 is a schematic diagram illustrating the networking of communication system in accordance with Embodiment 2 of the present invention.

FIG. 4 is a schematic diagram illustrating the networking of communication system in accordance with Embodiment 2 of the present invention. As shown in FIG. 4, which is a schematic diagram of implementing, via multiple BGs, IP cross-domain interconnecting based on the MGC-MG control mode. The communication system adopts two IP domains IPa domain and IPb domain which may be heterogeneous or homogeneous, and/or, the communication in each domain may adopt different protocols.

In FIG. 4, MGCa and MGCb are MGCs in IPa domain and IPb domain respectively, which may be called a calling MGC and a called MGC and may be used for controlling MGs in IPa domain and IPb domain, respectively. MGia and MGib are BGs, which may be respectively called a calling BG and a called BG and may be used for processing and forwarding media streams to common MGs of local domain and media streams to BGs of adjacent domain, to implement communication between MGs in IPa domain and IPb domain and implement protocol conversion between IPa and IPb domains. MGa and MGb are common MGs which may be used for representing users to implement call switching and media stream creating between the user side and the network side under the control of MGC. MGia, MGib, MGa and MGb shown in FIG. 4 are all logical entities, i.e virtual gateways.

Figure 5:
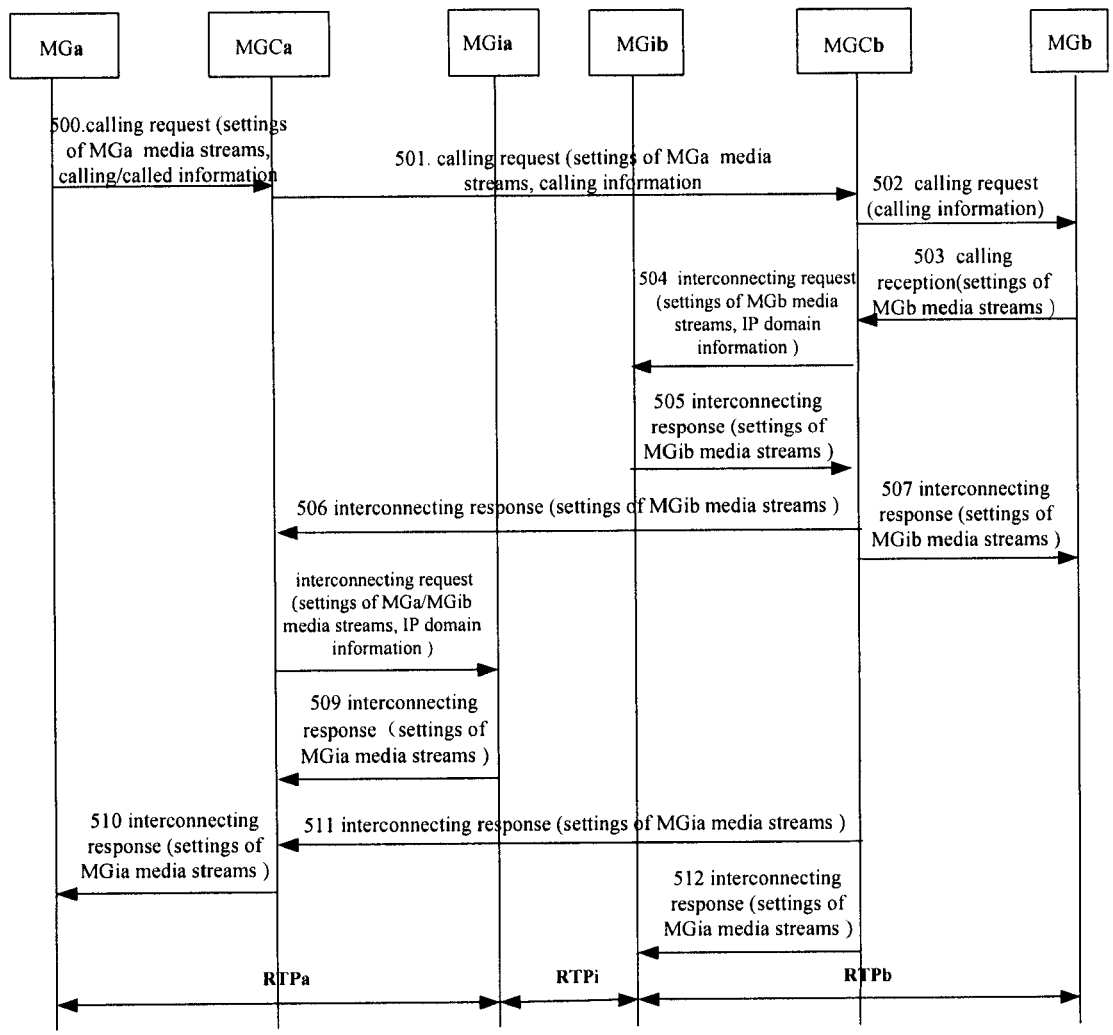
FIG. 5 is a stream chart of the communication method with the networking described by Embodiment 2 of the present invention.

FIG. 5 is a stream chart of communication method of networking described in Embodiment 2 of the present invention. The communication method for implementing IP cross-domain interconnecting via two BGs is hereinafter described in detail with reference to FIG. 4. In this embodiment, suppose that a calling user of MGa in IPa domain initiates a call request to a called user of MGb in IPb domain, and the method includes the following steps:

Step 500: MGa reports a call request initiated by the calling user of MGa to MGCa in charge of MGs in IPa domain via a media gateway control protocol, such as H.248.

Settings of calling media streams, i.e. settings of MGa media streams, called information, such as called number or called name as well as calling information, such as calling number or calling name, are included in the call request.

Step 501: MGCa finds that the called user is located in IPb domain by analyzing the called information in the call request, and forwards the call request to MGCb in charge of MGs of IPb domain via a call control protocol, such as SIP.

Step 502: MGCb forwards the calling information in the call request to MGb via a media gateway control protocol, such as H.248.

Step 503: if the called user of MGb accepts the call request of the calling user according to the calling information acquired from the MGCb, MGb configures settings of the called media streams, i.e. the settings of MGb media streams, and reports to MGCb a call acceptance including the settings of the called media streams.

In this step, whether to accept the call request of the calling user may be determined by the called user, according to the calling information such as the calling number or the calling name, in a manual or preset manner.

Step 504: MGCb sends to MGib, via a media gateway control protocol such as H.248, an interconnecting request including IP domain information of MGia, IP domain information of MGb and the settings of the called media streams, to instruct MGib to respectively create media streams RTPi from MGib to MGia and media streams RTPb from MGib to MGb.

Step 505: MGib reports to MGCb an interconnecting response including settings of media streams RTPi from MGib to MGia and RTPb from MGib to MGb configured by MGib, i.e. the settings of MGib media streams.

Steps 506-507: MGCb forwards to MGCa an interconnecting response including the settings of media streams RTPi from MGib to MGia; MGCb forwards to MGb an interconnecting response including the settings of media streams RTPb from MGib to MGb.

Step 508: MGCa sends to MGia, via a media gateway control protocol such as H.248, an interconnecting request including IP domain information of MGa, the settings of the calling media streams, IP domain information of MGib and the settings of MGib media streams, to instructs MGia to create media streams RTPa from MGia to MGa and media streams RTPi from MGia to MGib, respectively.

Step 509: MGia reports to MGCa an interconnecting response including settings of media streams RTPa from MGia to MGa and RTPi from MGia to MGib made by MGia, i.e. the settings of MGia media streams.

Steps 510-511: MGCa forwards to MGa the interconnecting response including the settings of media streams RTPa from MGia to MGa; MGCa forwards to MGCb an interconnecting response including the settings of media streams RTPi from MGia to MGib.

Step 512: MGCb sends to MGib the interconnecting response including the settings of media streams RTPi from MGia to MGib.

Thus, after receiving the settings of RTPa configured by MGia and the settings of RTPb configured by MGib, MGa and MGb communicate with MGia and MGib via media streams RTPa and RTPb, respectively; after receiving the settings of media streams RTPi made by each other, MGia and MGib implement interconnecting between media streams RTPa in IPa domain and media streams RTPb in IPb domain via media streams RTPi so that the calling user of MGa may communicate with the called user of MGb via MGia and MGib.

In accordance with Embodiment 2 of the present invention, the communication between two different IP domains may be implemented via a pair of BGs. Alternatively, IP cross-domain interconnecting may be implemented using multiple pairs of BGs in accordance with embodiments of the present invention.

It should be noted that the implementing method of the present invention is described in this disclosure by an example of two adjacent IP domains; it is also applicable to any two IP domains which are adjacent.

The foregoing are only preferred embodiments of the present invention and are not for use in limiting this invention, any modification, equivalent replacement or improvement made under the spirit and principles of this invention is included in the protection scope of this invention.

What is claimed is:

1. A method for implementing Internet Protocol (IP) cross-domain interconnecting between a calling IP domain and a called IP domain, wherein the calling IP domain comprises a first Media Gateway Controller (MGC) and a first Media Gateway (MG), the called IP domain comprises a second MGC and a second MG, and the calling IP domain connects to the called IP domain through a Border Media Gateway (BG), wherein the method comprises:
   receiving, by the first MGC, a call request based on H.248 from the first MG, wherein the call request comprises calling information, called information and settings of calling media streams;
   forwarding, by the first MGC, the call request to the second MGC;
   forwarding, by the second MGC, the call request to the second MG;
   reporting, by the second MG, a call acceptance including settings of called media streams to the second MGC, wherein the call acceptance is judged by a called user connecting to the second MG according to a preset white list or black list;
   forwarding, by the second MGC, an interconnecting request to the BG, wherein the interconnecting request comprises IP domain information of the first MG, the settings of the calling media streams, IP domain information of the second MG and the settings of the called media streams; and
   creating, by the BG, media streams from the BG to the first MG and media streams from the BG to the second MG, wherein the media streams from the BG to the first MG are created according to the IP domain information of the first MG and settings of the calling media streams, the media streams from the BG to the second MG being created according to the IP domain information of the second MG and settings of the called media streams.

2. The method of claim 1, wherein the calling information comprises calling number or calling name.

3. The method of claim 1, wherein the called information comprises called number or called name.

4. The method of claim 1, wherein the first MG is a User Network Interface (UNI) and wherein the settings of calling media streams comprise Real-time Transmission Protocol (RTP) media coding/decoding algorithm and packing period of time of the calling IP domain.

5. A communication system for implementing Internet Protocol (IP) cross-domain interconnecting, the system comprising:
   a calling IP domain; and
   a called IP domain;
   wherein the calling IP domain comprises a first Media Gateway Controller (MGC) and a first Media Gateway (MG), the called IP domain comprises a second MGC and a second MG, and the calling IP domain connects to the called IP domain through a Border Media Gateway (BG);
   wherein the first MGC is configured to receive a call request based on H.248 from the MG and forward the call request to the second MGC, wherein the call request comprises calling information, called information and settings of calling media streams;
   wherein the second MG is configured to report a call acceptance including settings of called media streams to the second MGC;
   wherein the BG is configured to receive an interconnecting request from the second MGC, wherein the interconnecting request comprises IP domain information of the first MG, the settings of the calling media streams, IP domain information of the second MG and the settings of the called media streams, wherein the BG is further configured to create media streams from the BG to the first MG and media streams from the BG to the second MG, wherein the media streams from the BG to the first MG are created according to the IP domain information of the first MG and settings of the calling media streams and wherein the media streams from the BG to the second MG are created according to the IP domain information of the second MG and settings of the called media streams;
   wherein the system further comprises a called user that connects to the second MG; and
   wherein the called user is configured to determine whether the call request can be accepted or rejected according to a preset white list or black list.

6. A border media gateway (BG) connecting a calling media gateway (MG) and a called media gateway, wherein the calling Internet Protocol (IP) domain comprises a first media gateway controller (MGC) and a first media gateway (MG), the called IP domain comprising a second MGC and a second MG, the BG comprising:
   a port; and
   a processor;
   wherein the port is configured to receive an interconnecting request from the second MGC, wherein the interconnecting request comprises IP domain information of the first MG, the settings of the calling media streams, IP domain information of the second MG and the settings of the called media streams;
   wherein the processor is configured to create media streams from the BG to the first MG and media streams from the BG to the second MG, wherein the media streams from the BG to the first MG is created according to the IP domain information of the first MG and settings of the calling media streams, the media streams from the BG to the second MG being created according to the IP domain information of the second MG and settings of the called media streams;
   wherein the second MG reports a call acceptance based on H.248 including settings of called media streams to the second MGC; and
   wherein the call acceptance is determined by a called user connecting to the second MG according to a preset white list or black list.

* * * * *